United States Patent [19]

Panster et al.

[11] Patent Number: 5,352,791
[45] Date of Patent: Oct. 4, 1994

[54] HYDRATING OR OXIDIZING PROCESS USING A METAL-CONTAINING, SHAPED ORGANOSILOXANE AMINE COPOLYCONDENSATE CATALYST

[75] Inventors: Peter Panster, Rodenbach; Stefan Wieland, Offenbach, both of Fed. Rep. of Germany

[73] Assignee: Degussa Aktiengesellschaft, Frankfurt am Main, Fed. Rep. of Germany

[21] Appl. No.: 121,580

[22] Filed: Sep. 16, 1993

Related U.S. Application Data

[62] Division of Ser. No. 860,715, Apr. 1, 1992, Pat. No. 5,264,514.

[30] Foreign Application Priority Data

Apr. 3, 1991 [DE] Fed. Rep. of Germany ....... 4110705

[51] Int. Cl.$^5$ ................ C07D 215/06; C07C 53/134; C08G 77/26
[52] U.S. Cl. ................ 546/165; 562/496; 528/30; 528/9; 528/38; 502/109; 502/158
[58] Field of Search ............ 546/165; 562/496; 528/30, 9, 38; 502/109, 158

[56] References Cited

U.S. PATENT DOCUMENTS 4,410,669 10/1983 Panster et al. .............. 525/474

(List continued on next page.)

FOREIGN PATENT DOCUMENTS 2433409 2/1975 Fed. Rep. of Germany .

(List continued on next page.)

OTHER PUBLICATIONS

K. H. Schmidt, *Chemische Industrie,* (1984) pp. 380–388, 572–576 and 716–718.
Chemical Abstract No. 274039/44 to Plurichemie et al., (1985).
Khatib, I. S. and R. V. Parish, "Insoluble Ligands and Their Applications" *Journal Organometallic Chemistry,* (1989), vol. 369, pp. 9–16.

Primary Examiner—Melvyn I. Marquis
Assistant Examiner—Margaret W. Glass
Attorney, Agent, or Firm—Beveridge, DeGrandi, Weilacher & Young

[57] ABSTRACT

Shaped organosiloxane amine copolycondensates are described which contain Pd, Pt, Ru and/or Rh, as well as optional promotors and/or moderators. The shaped copolycondensate function as a carrier for metals and are made up of units of:

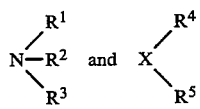

and/or units of Y—$R^6$. $R^2$ to $R^6$ are a group represented by the formula:

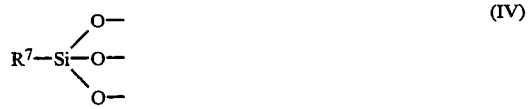

wherein $R^7$ is a group bound to N, X, or Y (for example, an alkylene group) and $R^1$ is $R^7$—$SiO_{3/2}$, H, $CH_3$, $C_2H_5$, or $C_3H_7$. X stands for a double-bonded group such as —S—, —$S_2$—, —$S_3$—, —$S_4$—, —HN—CS—NH— and Y stands for a monovalent groups such as —CN, —SCN, —SH, —S—$CH_3$, —$NH_2$, —NH—($CH_2$)$_2$—$NH_2$. The carrier substance may be cross-linked with cross-linking agents containing Si, Ti, Zr or Al. The metal-containing product is spherical in form and is defined by the parameters of sphere diameter, specific surface and pore volume as well as bulk density. Methods of production and use of the copolycondensates are also described.

3 Claims, No Drawings

U.S. PATENT DOCUMENTS

| | | | |
|---|---|---|---|
| 4,424,332 | 1/1984 | Panster et al. | 528/30 |
| 4,455,415 | 7/1984 | Panster et al. | 528/39 |
| 4,647,679 | 3/1987 | Panster et al. | 556/9 |
| 4,845,163 | 7/1989 | Panster et al. | 525/475 |
| 4,954,599 | 9/1990 | Panster et al. | 528/38 |
| 4,999,413 | 3/1991 | Panster et al. | 528/30 |
| 5,003,024 | 3/1991 | Panster et al. | 528/30 |
| 5,061,773 | 10/1991 | Panster et al. | 528/9 |
| 5,093,451 | 3/1992 | Panster et al. | 528/9 |
| 5,094,831 | 3/1992 | Klockner et al. | 423/342 |
| 5,130,396 | 7/1992 | Panster et al. | 528/9 |
| 5,237,019 | 8/1993 | Wieland et al. | 525/475 |

FOREIGN PATENT DOCUMENTS

| | | |
|---|---|---|
| 3131954 | 10/1984 | Fed. Rep. of Germany . |
| 3404702 | 3/1988 | Fed. Rep. of Germany . |
| 3800563 | 3/1989 | Fed. Rep. of Germany . |
| 3925359 | 2/1991 | Fed. Rep. of Germany . |
| 3925360 | 2/1991 | Fed. Rep. of Germany . |
| WO91/14500 | 10/1991 | PCT Int'l Appl. . |

HYDRATING OR OXIDIZING PROCESS USING A METAL-CONTAINING, SHAPED ORGANOSILOXANE AMINE COPOLYCONDENSATE CATALYST

This application is a divisional of co-pending application Ser. No. 07/860,715 filed on Apr. 1, 1992, now 5,264,514, which application is entirely incorporated herein by reference.

BACKGROUND OF THE INVENTION

The subject matter of this invention relates to metal-containing organosiloxane amine copolycondensates which exhibit a random, block-shaped or mixed distribution of the components in a polymer matrix. The shaped or formed polysiloxanes containing Pd, Pt, Ru and/or Rh exhibit an advantage in the areas of methodology and application technology, in that these shaped, polysiloxanes have a macroscopic spherical form and constitute valuable catalysts, especially for hydrogenation and oxidation reactions. Especially preferred properties of the heterogenous catalysts in accordance with the invention are the very good physical properties, as well as the high reproducibility of the organopolysiloxane carrier. Furthermore, methods are described according to which these products may be produced and used.

Heterogeneously used noble-metal carrier catalysts for use in hydrogenation and oxidation reactions are prepared according to the state of the art by applying a noble metal partially in elemental form, but primarily in the form of a compound, onto a suitable catalyst carrier. If the metal is deposited in the form of a compound, the metal-charged carrier must be subsequently subjected to a reductive treatment.

The reduction may occur in conjunction with the application of the metal in the liquid phase by means of a treatment with a reducing agent, such as a hydrazine. Alternatively, the reduction may take place after drying by means of a treatment with hydrogen at a rather high temperature in the gas phase. As another alternative, the reduction may take place immediately before or during the catalytic use in the reaction medium. Commonly used carriers for this purpose are activated carbon and inorganic materials, such as aluminum oxide, silica gel or zeolites (see K. H. Schmidt, Chemische Industrie (1984), pp. 380–388, 572–576, and 716–718).

Some of the disadvantages of these carrier materials are the deficient reproducibility of the physical and chemical properties (for example, in the case of activated carbon); the partially unsatisfactory physical and mechanical properties; the fact that they are unformed as a rule and must be formed subsequently; and very importantly, their deficient functionality, via which no control of the metal dispersity and the catalytic properties are possible. The last disadvantage named above is often present in such a manner that a chemical post-treatment (e.g. poisoning with sulfur) is necessary to adjust certain catalytic properties.

SUMMARY OF THE INVENTION

This invention relates to shaped organosiloxane amine copolycondensates containing palladium, platinum, ruthenium and/or rhodium as well as optional promotors and/or moderators, wherein the shaped organosiloxane amine copolycondensate include units of the formula:

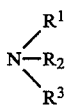
(I)

and of units of the formula:

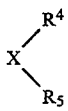
(II)

and/or of units of the formula:

 (III), wherein $R^2$ to $R^6$ are identical or different and signify a group of the formula:

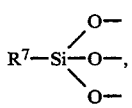
(IV)

wherein $R^7$ is bound directly to the nitrogen atom or the group X or the group Y and constitutes a linear or branched alkylene group with 1 to 10 carbon atoms, a cycloalkylene group with 5 to 8 carbon atoms or a unit of the formula:

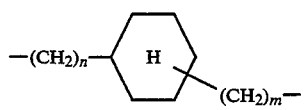

or

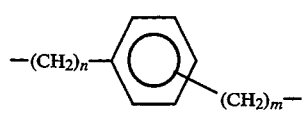

in which n and m are numbers from 0 to 6 and "n" indicates the number of methylene groups in N, X and Y position and "m" indicates the number of methylene groups in Si position, $R^1$ is likewise a group of formula (IV) or stands for H, $CH_3$, $C_2H_5$, $C_3H_7$, X stands for —S—, —$S_2$—, —$S_3$—, —$S_4$—

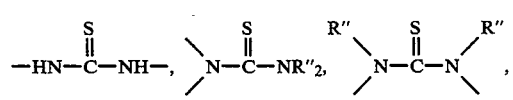

and

Y stands for —CN, —SCN, —SH, —S—CH$_3$, —S—C$_2$H$_5$, —S—C$_3$H$_7$, —NH$_2$, —NH—(CH$_2$)$_2$—NH$_2$, —NH—(CH$_2$)$_2$—NH—(CH$_2$)$_2$—NH$_2$, —N(CH$_3$)$_2$, —N(C$_2$H$_5$)$_2$, —N(C$_3$H$_7$)$_2$,

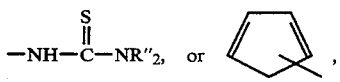

in which

R″ is H; a linear or branched alkyl group with 1 to 5 carbon atoms; or a —(CH$_2$)$_n$—NR‴$_2$ group, in which n signifies a number from 1 to 6 and R‴ is H or a linear or branched alkyl group with 1 to 5 carbon atoms, wherein the free valences of the oxygen atoms bound to the Si atoms are saturated as in silica skeletons by silicon atoms of further groups of formula IV and/or via the metal atoms in one or several cross-linking binding links of the formula:

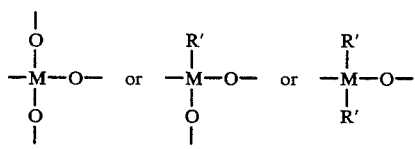   (V)

and

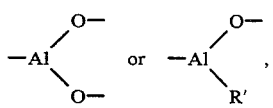

wherein M is an Si, Ti or Zr atom and R′ is a linear or branched alkyl group with 1 to 5 carbon atoms, or a phenyl group, the ratio of the silicon atoms from the groups of formula (IV) to the metal atoms in the cross-linking binding links (V) is from 1:0 to 1:30 and the metal-containing polymeric organosiloxane copolycondensates are present macroscopically as spherical particles with a diameter of 0.01 to 3.0 mm, preferably 0.05 to 2.5 mm, with a specific surface of 0.01 to 1000 m$^2$/g, preferably 0.01 to 700 m$^2$/g, with a specific pore volume of 0.01 to 6.5 ml/g and a bulk density of 50 to 1000 g/l, preferably 100 to 700 g/l.

The disadvantages described above can be largely avoided in accordance with the invention if the shaped organosiloxane amine copolycondensates of the type obtainable by way of the components and methods described in German Patent Application Nos. 39 25 359 and 39 25 360 are used as a carrier for the heterogeneous catalysts containing Pd, Pt, Ru and/or Rh. German Patent Application Nos. 39 25 359 and 39 25 360, respectively, relate to U.S. patent application Ser. No. 07/556,486, filed Jul. 24, 1990, and U.S. Pat. No. 5,093,451. U.S. Pat. No. 5,093,451 is entirely incorporated herein by reference.

These carriers can be obtained directly in the form of spheres with the diameters required for use in suspensions or in a fixed bed and can be adapted in their physical and chemical properties in an ideal manner for the requirements of this use. Thus, for example, particle sizes of 0.01 to 3.0 mm, a specific surface of 0.01 to 1000 m$^2$/g or a pore volume of 0.01 to 6.5 ml/g can be set. At the same time, the metal dispersity and metal distributions can be purposefully set via the functional groups of units according to formula (I) and (II) and/or (III). In addition, influence can be exerted on the catalytic properties, for example, by means of a poisoning effect, via the functional groups of the units according to formula (II) and/or (III). A corresponding situation also applies to the crosslinking binding links (bridge-type crosslinks) of formula (V). It is also advantageous that the metal adherence can be distinctly improved on the one hand by the spherical form of the carrier and by the associated reduced wear, and, on the other hand, also by the functional groups of units (II) and/or (III), which is especially important during use in complexing as well as in aggressive media.

The organosiloxane amine copolycondensates used as a carrier have practically all of the advantageous properties of inorganic polymer systems; in addition, they can be very sharply modified and adapted to the catalytic requirements. This takes place, among other things, via the density of the functional groups of the units according to formula (I) and (II) and/or (III), which are controlled in turn via the type and the amount of the cross-linking binding links according to formula (V) in the polymeric carrier.

A frequently used cross-linking unit is the SjO$_{4/2}$ unit, which is frequently also associated with an increase in stability. Cross-linking groups of formula (V) containing organic groups can also be used to control the surface properties of the catalytic system, especially with regard to hydrophobic properties. Finally, the grouping of cross-linking agents can also exert a co-catalytic influence.

The ratio of the sum of units of formula (I) and (II) and/or (III) to the cross-linking binding links (V) can vary sharply and can be within the limits of 1:0 to 1:30. In this range, no problems with the morphological, physical and chemical properties occur.

A similar situation also applies to the ratio of units of formula (I) to units of formula (II) and/or (III), which can be within the range of 10:90 to 95:5 (molar ratio).

The ratios to be selected in practice depend primarily on the type of catalyst to be produced, the corresponding area of application, and the chemical and physical properties which are optimal to this end, for example, on whether a high metal concentration or a high density of groups according to formula (I) and (II) and/or (III) is required for adjusting the metal dispersity or for influencing the catalytic properties.

The structural elements (I), (II), (III) and (V) of the organosiloxane amine copolycondensates used as carriers can be described, for example, by formulas such as:

N((CH$_2$)$_3$SiO$_{3/2}$)$_3$, N((CH$_2$)$_{10}$SiO$_{3/2}$)$_3$, HN((CH$_2$)$_3$SiO$_{3/2}$)$_2$, S((CH$_2$)$_3$SiO$_{3/2}$)$_2$, S=C(NH—(CH$_2$)$_5$SiO$_{3/2}$)$_2$, NC—(CH$_2$)$_3$—SiO$_{3/2}$, H$_2$N—(CH$_2$)$_2$—NH—(CH$_2$)$_3$SiO$_{3/2}$, SiO$_{4/2}$, (CH$_3$)$_2$SiO$_{2/2}$, AlO$_{3/2}$, TiO$_{4/2}$, and C$_6$H$_5$SiO$_{3/2}$.

The combination of two or several of the metals with each other, or also with other transitional metals, alkali metals and/or alkaline earth metals, as well as with the metals of Group III, Group IV and Group V, with Li, Na, K, Mg, Ca, Fe, Cu, Ag, Au, Zn, Cd, Sn, Pb, Sb and Bi being especially preferred, offers additional possibilities with regard to reactivity and selectivity of the catalysts, in addition to the ability to control these properties via groups (I), (II) and/or (III). The use of multimetal catalysts is known. The additional metal components which are added act in this connection as promotors or moderators. The combination of several metals has proven to be advantageous, e.g. in the synthesis of vinyl acetate. Combinations such as Pd/Au, Pd/Cd or Pd/Au/Bi/K, among others, are described in this area.

Pd/Pt/Bi catalysts are frequently used for oxidation reactions, and Pd/Pb systems are used for the selective hydrogenation of C-C triple bonds to alkenes.

In the case of the metal-containing, shaped copolycondensates in accordance with the invention, synergistic effects result from the combination of various metals.

A special significance is attributed, due to the special material properties and the availability of the initial materials, to organosiloxane amine copolycondensates in which R$^1$ to R$^6$ are a group of the formula (IV) and are identical or different. A similar situation also applies to the compounds in accordance with the invention wherein R$^1$ to R$^6$ stand for a group of formula (VI) as follows:

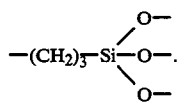

(VI)

It can be important for different forms of the application of metal, even as a function of the metal concentration, if the organosiloxane copolycondensates are present in the form of statistical, block or mixed compounds. Specifically, it can be advantageous, for example, if all of the units according to formula (I) or (II) and/or (III) are present at the surface zones of the particles. This can be the case, for example, if it is a question of concentrating the applied metal, possibly at a low total concentration, at the surface zones of the spherical particles. On the other hand, it can be advantageous in the case of a very high metal concentration to distribute the units according to formula (I) or (II) and/or (III) uniformly over the entire polymer particle and, if necessary, to arrange them in the form of blocks thereby.

Likewise, one component of the copolycondensate can be brought with preference into the surface zones of the polymer particle in order to the adjust certain surface properties.

As a rule, the highest activity of the metal-containing copolycondensates when used as catalyst is given when the applied metal is largely present in a zero-valent state, that is, in elemental form. This takes place with the aid of the method in accordance with the invention. The conversion of the applied metal compound to the zero-valent form naturally can also take place immediately prior to catalytic use by reductively treating the initial product with hydrogen in a moist or a dry state, at room temperature to 300° C. and at normal pressure to a superpressure, or before or during one of its applications. The conversion may optionally take place in the medium of the application. These applications include the following: the use of the metal-containing, shaped organosiloxane amine copolycondensate products as catalysts for hydrogenation reactions and oxidation reactions, wherein the catalysts are used for reactions in the liquid phase or in the gas phase, in a suspension or in a fixed bed or in a fluidized bed. In this specification, room temperature refers to about 20° C. and normal pressure refers to about 1 atmosphere.

It is advantageous to vary the noble-metal content such that the metal content of the polymer system is 0.001% by weight to 20.0% by weight, preferably 0.01% by weight to 10% by weight, as a function of the particular use for the catalysts of the invention. As a rule, an increase of the content of one of the noble metals is associated thereby with an increase in the catalytic activity. This can be very desirable in individual instances, for example, if short residence times are required. However, a loss of selectivity may also be frequently observed along with the increase in the noble metal concentration. Thus, catalysts with relatively low noble metal content are of interest in various instances in which the desired catalysts are highly selective, but in these instances, the noble metal is applied in the form of a thin layer of only a few micrometers onto the carrier of shaped organosiloxane amine copolycondensate; i.e. a shell catalyst.

This invention also relates to methods of producing the catalysts. The method in accordance with the invention essentially includes the application of a noble metal compound including Pd, Pt, Ru and/or Rh onto a shaped organosiloxane amine copolycondensate in a manner similar to that described in German Patent Nos. 39 25 359 and 39 25 360. The method in accordance with the invention additionally includes a subsequent reductive posttreatment of the metal-containing carrier. In principle, all possible metal compounds can be used as the initial materials, because these metal compounds must exhibit solely a minimum degree of solubility and a readiness for an easy reductive decomposition. Especially important metal compounds, because of their commercial availability and/or ease in preparation, are aqueous or moisture-free metal compounds according to formula (VII). Such compounds in accordance with formula (VII) are as follows:

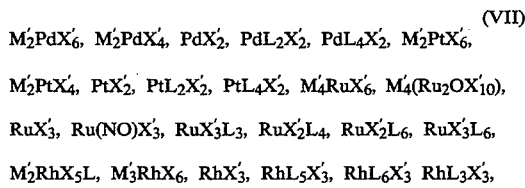

-continued
RhL₄X'₃, and M'RhX'₄L₂, wherein
X' is selected from the group consisting of Cl, Br, I, CN, NO₂, NO₃, ½ SO₄, acetate, acetylacetonate, or OH, L is selected from the group of NH₃, primary, secondary or tertiary amines or diamines, CO or H₂O, and M' is selected from the group consisting of H, Na, K NH₄, ½ Ca, ½ Ba.

In the method in accordance with the invention, the compound of formula (VII) may be reacted in a sufficient proportion to produce a desired metal concentration in a solvent or solvent mixture which at least partially dissolves the metal compound (VII), with a spherically shaped organosiloxane amine initial material present in the form of a statistical, block or mixed copolycondensate, the shaped organosiloxane amine copolycondensate including units of formula (I):

   (I)

and units of formula (II):

   (II)

and/or units of formula (III):

Y—R⁶   (III), wherein R² to R⁶ are identical or different and signify a group of formula (IV):

   (IV)

wherein R⁷ is bound directly to the nitrogen atom or the group X or the group Y, wherein R⁷ is selected from the group consisting of a linear or branched alkylene group with 1 to 10 carbon atoms, a cycloalkylene group with 5 to 8 carbon atoms or a unit of a formula as follows:

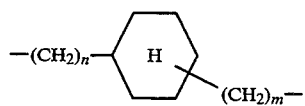

or

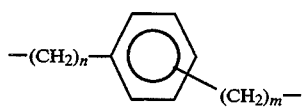

wherein "n" and "m" are each a number in the range of 0 to 6, wherein n indicates the number of methylene groups in the N, X and Y position and m indicates the number of methylene groups in the Si position;

R¹ is selected from the group consisting of formula (IV), H, CH₃, C₂H₅, or C₃H₇, X is selected from the group consisting of —S—, —S₂—, —S₃—, —S₄—,

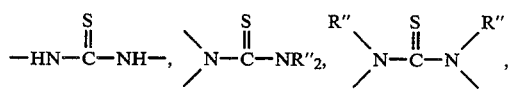

or

and

Y stands for —CN, —SCN, —SH, —S—CH₃, —S—C₂H₅, —S—C₃H₇, —NH₂, —NH—(CH₂)₂—NH₂, —NH—(CH₂)₂—NH—(CH₂)₂—NH₂, —N(CH₃)₂, —N(C₂H₅)₂, —N(C₃H₇)₂,

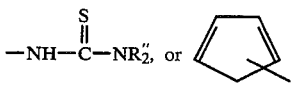

wherein R" is selected from the group consisting of H, a linear or branched alkyl group having 1 to 5 carbon atoms or a —(CH₂)ₙ—NR'''₂ group, in which n signifies a number from 1 to 6 and R''' is H or a linear or branched alkyl group having 1 to 5 carbon atoms, wherein the free valences of the oxygen atoms bound to the Si atoms are saturated as in silica skeletons by silicon atoms of further groups of formula (IV) and/or via the metal atoms in one or several cross-linking binding links selected from the group of formula (V):

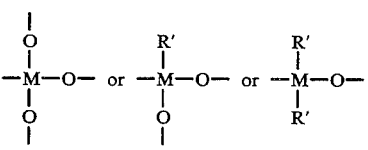   (V)

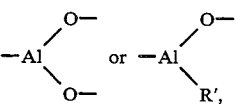

wherein M is selected from the group of an Si, Ti or Zr atom and R' is selected from the group of a linear or branched alkyl group with 1 to 5 carbon atoms or a phenyl group, and the ratio of the silicon atoms of the groups of formula (IV) to the metal atoms or Al in the cross-linking binding links (V) is 1:0 to 1:30 and the spherical particles have a diameter of 0.01 to 3.0 mm, a specific surface of 0.01 to 1000 m²/g, a specific pore volume of 0.01 to 6.5 ml/g and a bulk density of 50 to 1000 g/l.

After reaction, the resulting metal-containing solid is treated in a reductive treatment, optionally after a change of the solvent, before or after a separation of the liquid phase, followed by a washing or extracting with the same or another solvent. This material is then dried at a temperature in the range of room temperature to 250° C. air, under a protective gas or in a vacuum. Tempering can then take place in air or under protective gas at 150° to 300° C. The resulting solid is classified, optionally with an amount of a reducing agent for a period of 1 minute to 48 hours at a temperature in the range of room temperature to 200° C., and optionally at a superpressure corresponding to the sum of the partial pressures of the components of the reaction mixture at the reaction temperature.

Suitable solvents for use in accordance with the invention must be capable of dissolving the metal compound at least partially. This requires a thoroughly polar solvent. Examples of suitable solvents are as follows: acetone, nitromethane, ethylene glycol, diethylene glycol, triethylene glycol and their corresponding ethers, dimethylformamide, dimethylsulfoxide, tetrahydrofurane, dioxane and acetonitrile. However, water and lower linear or branched alcohols with 1 to 5 carbon atoms or the corresponding water/alcohol mixtures are especially preferred for engineering, toxicologic and economic reasons.

The reaction temperature selected during the reaction of the metal compound according to formula (VII) with the organopolysiloxane copolycondensate is below, at or above room temperature for reaction times of 1 minute to 48 hours. These parameters depend in particular on the solubility and the stability of metal compound (VII), as well as on the type of the organopolysiloxane, e.g., depending on the content of the groups according to formula (II) and/or (III). It is generally advantageous to carry out this reaction at as low a temperature as possible, and room temperature is especially preferred.

Higher temperatures may be used if the solubility of the metal component is unsatisfactory at room temperature or if its absorption on the carrier proceeds only very slowly. An analogous situation also applies to the reaction time, which must in particular take into account the absorption onto the carrier. As a general rule, it is preferred if the reaction time is not extended significantly beyond the time required for complete metal absorption.

When working in an aqueous or alcoholic medium, it can be advantageous, with respect to the attainment of a high metal dispersity and to avoid the formation of poorly complexing metal oxides or metal hydroxides, if the pH of the reaction solution is adjusted with the aid of an inorganic or organic acid or base to a particular value in the range of 4–10.

In the production of copolycondensates containing several metals, the metals can be applied either by means of a simultaneous reaction of the copolycondensate with metal compounds of formula (VII) under the cited conditions, or the work can be performed in several successive reaction steps and the metal-containing solid can be subjected partially or completely to all necessary treatments following the application step or steps.

The preferred reductive treatment of the solid containing one or several metals is one in which the metal is still present in the form of a metal complex compound. This reductive treatment preferably takes place in an aqueous medium, especially in view of the fact that the byproducts, e.g., inorganic salts, which are formed during the reduction treatment dissolve well and thus can be readily separated from the metal-containing final product. The time of this treatment and the temperature at which it is carried out depend in particular on the type and amount of the reducing agent selected and on the stability of the polymeric metal complex resulting from the reaction of metal component (VII) with the copolycondensate. It is understandable that the higher the temperatures and the longer the treatment times selected, the more stable the metal complex. Generally, however, this step is quantitatively terminated within, at the longest, a few minutes to a few hours. After termination, the metal-containing, spherical solid is separated from the liquid phase by decanting or filtering. The solid may preferably be washed with the same solvent and then supplied directly for use or dried under the indicated conditions. Optionally, the solid may additionally be tempered and classified.

One embodiment of the method of the invention provides that the metal-containing solid remaining after the separation of the liquid phase is washed with a lower linear or branched alcohol having 1 to 5 carbon atoms, independent from the solvent used when applying the metal component onto the carrier, and thus the solid is intensively moistened with one of these alcohols. One advantage of this method is that it is easier to dry the metal-containing solid, e.g., if water is used as the solvent during the reductive treatment. Another advantage is that the washing can also aid to complete the reduction of the metal component during the drying step and, if necessary, during the tempering step.

Preferred reducing agents used in accordance with this invention are as follows: a linear or branched alcohol with 1 to 5 carbon atoms; formaldehyde; an alkali formate; alkaline-earth formate; hydrazine; a hydrazine compound; an alkali-metal boron hydride; an alkaline-earth metal boron hydride; hydrogen; carbon monoxide; a borane compound in a dry state; an alkalialanate; alkaline-earth metal alanate; alane; an alane compound; an alkali-hydride; or an alkaline-earth metal hydride.

A variation in the method of the reductive treatment provides that the metal-charged, shaped organosiloxane amine copolycondensate is separated by customary separation techniques from the liquid phase and is then first dried and tempered. The reductive treatment is carried out either during the drying and tempering, for example, by means of reaction with hydrogen, carbon monoxide, mixtures thereof, volatile alcohols or aldehydes, or it is not carried out until a later point in time. The properties of the catalytic system obtained can be heavily influenced by this special form of reduction.

In addition thereto, very stable metal complexes can be destroyed and the elemental metal separated therefrom. Alternatively, the reduction can be deferred and not carried out until at a later point in time, preferably in conjunction with the catalytic use. This preferably takes place by means of a reductive treatment with hydrogen before or during a hydrogenation reaction. This reductive treatment may preferably take place with hydrogen in a moist or a dry state before or during one of its applications or uses, optionally in the medium of the application or use, at a temperature in the range of room temperature to 300° C. at normal pressure or at a superpressure.

This variation in the reduction treatment offers advantages in the event that the reductively treated metal-containing solid is difficult to handle because it is deactivated or if it ignites upon contact with air.

In another method variation in accordance with the invention, the application of metal onto the shaped organosiloxane copolycondensate preferably takes place in water or in a lower alcohol with 1 to 5 carbon atoms, and the reductive treatment is carried out using the alcohol which remained after the washing or extraction steps on the metal-containing solid as the reducing agent during the drying and/or tempering.

The metal-containing, shaped organosiloxane copolycondensates of the invention exhibit very good properties when used as catalysts for the transfer of hydrogen or oxygen, that is, especially for carrying out hydrogenation and/or oxidation reactions. The high selectivity of these reaction sites, such as the bond wherein carbon-carbon multiple bonds can be selectively hydrogenated near other functional groups, such as keto groups, is particularly evident in the case of hydrogenation reactions.

Basically, metal-specifically analogous catalytic basic properties are given, as in the case of other noble-metal catalysts, based on activated carbon or inorganic or organic carrier systems, such that, in principle, hydrosilylizing reactions can also be carried out with the platinum-containing representatives in accordance with the invention.

These novel catalysts may be used in a fixed bed or in a fluidized bed for reactions in a liquid or a gaseous phase, in particular, as a function of the set grain size. An important advantage of the invention, given the spherical form of the polysiloxane carrier, both in the case of small particle diameters and also rather large particle diameters, is the lesser flow resistance and negligible wear of the particles in accordance with the invention.

DETAILED DESCRIPTION OF THE INVENTION

The invention will be described in more detail in conjunction with the following examples of various embodiments of the invention. These Examples should be construed as illustrating the invention and not limiting the same.

EXAMPLES

Example 1

20 grams of an organosiloxane copolycondensate of the formula $S(CH_2-CH_2-C_2-SiO_{3/2})_2.0.2N(CH_2-CH_2-CH_2-SiO_{3/2})_3$, with spherical particles having a granularity of 95% between 0.2 and 0.8 mm were suspended in 150 ml distilled water and compounded with a solution of 2.25 grams $K_2PtCl_4$ dissolved in 50 ml water. The mixture was agitated for 1 hour at room temperature in order to adsorb the noble-metal compound. The solid was filtered off and the colorless solution was discarded. The yellow raw product was placed in 180 ml water and compounded with 2.69 grams $NaBH_4$ (95%).

The batch was spontaneously reduced and the temperature rose to 60° C. The catalyst was removed by suction, washed with water and then with methanol, and dried under nitrogen gas $(N_2)$ at 150° C.

Example 2

10 grams of an organopolysiloxane copolycondensate of the formula $HSCH_2-CH_2-CH_2-SiO_{3/2}.N(CH_2-CH_2-CH_2-SiO_{3/2})_3$ with spherical particles having a granularity of 90% between 0.1 and 0.4 mm were suspended in 150 ml distilled water, compounded with a solution of 1.13 grams $K_2PtCl_4$ dissolved in 50 ml water and agitated. After 35 minutes, the supernatant solution was colorless and the adsorption concluded. The orange-yellow solid was isolated (Nutsche), transferred into a round flask, compounded with 100 ml solution of sodium formate (4.59 grams sodium formate) and the pH adjusted with NaOH to 8.7. The suspension was heated to 60° C. and agitated for one hour at this temperature. The catalyst was removed by suction, washed with water and ethanol and dried at 110° C. for 12 hours in a vacuum. The finished catalyst was colored olive green.

Example 3

10 grams of a shaped organopolysiloxane copolycondensate of the formula $H_2N-(CH_2)_2-NH-(CH_2)_2-NH-(CH_2)_3-SiO_{3/2}.N(CH_2-CH_2-CH_2-SiO_{3/2})_3.SiO_2$ were suspended in 80 ml water and 698 mg $RhCl_3.xH_2O$ (37.7% Rh), dissolved in 20 ml water, were added. The mixture was first agitated for one hour at room temperature and then for four hours at 55° C.

The solution, which was dark red at first, discolored and a yellow solid was isolated after filtration. The catalyst was washed with ethanol, dried at 90° C. in a vacuum and then used immediately for hydrogenation reactions.

Example 4

272.77 grams (0.433 mole) of $N[CH_2-CH_2-CH_2-Si(OC_2H_5)_3]_3$, 36.86 grams (0.087 mole) of $HN[CH_2-CH_2-CH_2-Si(OC_2H_5)_3]_2$, 100.17 grams (0.433 mole) of $NC-CH_2-CH_2-CH_2-Si(OC_2H_5)_3$ and 90.19 grams (0.433 mole) of $Si(OC_2H_5)_4$ were combined in 500 ml ethanol in the manner described in German Patent Nos. 39 25 359 and 39 25 360. The mixture was heated in a three liter reaction vessel with a KPG agitator with a crescent-shaped agitator blade, a reflux condenser and an internal thermometer to 75° C. The clear solution was compounded with 150 ml desalinated water of 90° C., then agitated for 10 minutes under reflux and then cooled down to 65° C. The clear, viscous solution was maintained at this temperature under slow agitation until the start of gelling. One minute after the start of gelling, 500 ml 1-octanol were added and after the homogenization was completed, 800 ml water with a temperature of 50° C. were added. The mixture was then agitated for 2 hours at 700 rpms at reflux temperature, then cooled off, and the entire reaction mixture was transferred into a steel autoclave and slowly agitated 24 hours at 150° C. and at the inherent internal pressure.

The mixture was then cooled off and the formed solid separated from the liquid phase and extracted twice with 500 ml ethanol each time. After 4 hours of drying at 90° C. and 12 hours of drying at 135° C. under an atmosphere of $N_2$, a symmetric, spherical product was isolated in a yield of 97.5% of theory. The product included polymer units of the formula $N(CH_2-CH_2-CH_2-SiO_{3/2})_3$. 0.2 $H-N(CH_2-CH_2-CH_2-SiO_{3/2})_2$. $NC-(CH_2)_3-SiO_{3/2}.SiO_2$.

Five grams of this shaped organopolysiloxane copolycondensate (grain size distribution 0.3–1.2 mm) were compounded with 50 ml water, in which 558 mg $RhCl_3.x H_2O$ (37.7% Rh) were dissolved. This mixture was agitated at room temperature for one hour, and then agitated at 70° C. for 1 hour. The pH thereby rose from 1.5 to 3.8. The bright yellow solid was removed by suction and placed in 50 ml water. 9.6 ml of 37% by weight formalin solution were added, the pH was alkalinely adjusted and the mixture was agitated 3 hours at 60° C. The polysiloxane, which was now colored green, was removed by suction, washed repeatedly with water and ethanol, and dried at 150° C. in a current of $N_2$, during which the catalyst turned black.

Example 5

Five grams of a shaped organopolysiloxane copolycondensate of the formula $S=C[NH(CH_2)_3-SiO_{3/2}]_2$. 0.5 $N(CH_2-CH_2-CH_2-SiO_{3/2})_3$ (grain size distribution 0.2–0.6 mm) were compounded with 50 ml water, in which 819.8 mg $Na_2PdCl_4$ were dissolved. This mixture was agitated at room temperature for one hour and then agitated at 70° C. for one hour. The pH was adjusted with $Na_2CO_3$ to a pH of about 8.

The solid was isolated by filtration, placed in 40 ml water, and the pH was adjusted to 9.2. 9.3 ml of 37% by weight formalin solution was added and the mixture was boiled for one hour under reflux. The metal-containing polysiloxane was filtered off and dried in a drying cupboard at 135° C.

Example 6

Five grams of an organopolysiloxane copolycondensate of the formula $S_4(CH_2-CH_2-CH_2-SiO_{3/2})_3$. $SiO_2$ with spherical particles of a grain size of 0.2–0.8 mm were compounded with 50 ml of a solution of 736.1 mg $RuCl_3. H_2O$ (35.75% Ru) in water. The pH of this mixture was adjusted with $K_2CO_3$ to 6.0 and the mixture was agitated for 45 minutes at 60° C. After the solution had cooled off, the pH was adjusted to 9.0 and 5.1 ml of 37% by weight formalin solution was added. The mixture was reheated up to 60° C. and agitated for one hour at this temperature. Isolation of the catalyst took place as in Example 1.

Example 7

Ten grams of a polysiloxane prepared according to Example 7 of German Patent No. 39 35 359 were reacted according to Example 5 with 819.8 mg $Na_2PdCl_4$ and a solid of the composition 2 $C_5H_4(CH_2-CH_2-CH_2-SiO_{3/2})_2$ . $N(CH_2-CH_2-CH_2-SiO_{3/2})_3/2.8\%$ Pd was obtained.

Example 8

Five grams of a polysiloxane obtained according to Example 14 of German Patent No. 39 25 359 were reacted according to Example 1 and a solid of the composition 0.1 $S(CH_2-CH_2-CH_2-SiO_{3/2})_2.N(CH_2-CH_2-CH_2-SiO_{3/2})_3.0.05$ $ZrO_{4/2}/5\%$ Pt was obtained.

Example 9

Five grams of a polysiloxane obtained according to Example 7 of German Patent No. 39 25 360 were reacted according to Example 5 and a solid of the composition $(C_2H_5)_2N-CS-NH-(CH_2)_3-SiO_{3/2}.N[(CH_2)_8SiO_{3/2}]_3.SiO_2/5\%$ Pd was obtained.

Example 10

Ten grams of a polysiloxane of the composition $N[(CH_2)_3SiO_{3/2}]_3.5$ $SiO_2.H_3C-(CH_2)_7SiO_{3/2}$ were reacted according to Example 6 with $RuCl_3.\times H_2O$ and 10.1 grams of a solid containing 1% Ru was isolated.

Example 11

Ten grams of a polysiloxane of the composition $N[(CH_2)_3SiO_{3/2}]_3.2$ $AlO_{3/2}.(H_3C)_3SiO_{\frac{1}{2}}$ were reacted according to Example 6 with $Na_2PdCl_4$ and 10.01 grams of a solid containing 0.1% Pd was isolated.

Example 12

400 mg of the Pd catalyst produced in Example 5 were placed with 10 grams of cinnamic acid in 100 ml ethanol into a low-pressure hydrogenating apparatus consisting of glass with a gassing agitator. Cinnamic acid was hydrogenated at a temperature of 25° C. and an $H_2$ superpressure of 10 mbars to phenylpropionic acid. The catalytic activity was 12 ml $H_2$/min./g catalyst.

Example 13

One gram of the Rh catalyst produced in Example 4 was placed with 10 ml quinoline in 100 ml ethanol into a low-pressure hydrogenating apparatus consisting of glass with a gassing agitator. Quinoline was hydrogenated at a temperature of 40° C. and an $H_2$ superpressure of 10 mbars. The catalytic activity was 16 ml $H_2$/min./g catalyst.

While the invention has been described in conjunction with various particular examples, those skilled in the art will recognize that various changes and modifications may be made without departing from the spirit and scope of the invention as defined in the claims.

The priority document, German Patent Application No. P 41 10 705.5, filed in Germany on April 3, 1991, is relied on.

We claim:

1. A process for hydrogenating or oxidizing a compound, comprising:

subjecting the compound to hydrogenation or oxidation conditions in the presence of a catalyst, wherein the catalyst is a shaped organosiloxane amine copolycondensate, including: at least one metal selected from the group consisting of: palladium, platinum, ruthenium, rhodium, and mixtures thereof, wherein the metal or metals are present predominately in elemental form; optionally promotors, moderators, or both, wherein the shaped organosiloxane amine copolycondensate includes units of formula (I):

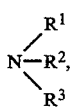  (I)

and at least one member selected from the group consisting of units of formula (II) and units of formula (III), wherein the units of formula (II) are represented as follows:

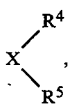  (II)

and the units of formula (III) are represented as follows:

Y—R⁶  (III), wherein R² to R⁶ are identical or different and signify a group of formula (IV):

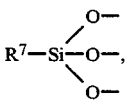  (IV)

wherein R⁷ is bound directly to the nitrogen atom or the group X or the group Y, wherein R⁷ is selected from the group consisting of: a linear or branched alkylene group with 1 to 10 carbon atoms, a cycloalkylene group with 5 to 8 carbon atoms and a unit of a formula as follows:

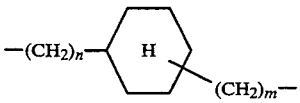

or

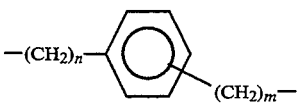

wherein

"n" and "m" are each a number in the range of 0 to 6, wherein n indicates the number of methylene groups in the N, X and Y position and m indicates the number of methylene groups in the Si position;

R¹ is selected from the group consisting of: formula (IV), H, CH₃, C₂H₅, and C₃H₇, X is selected from the group consisting of: —S—, —S₂—, —S₃—, —S₄—

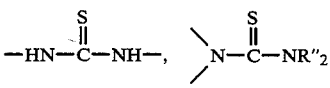

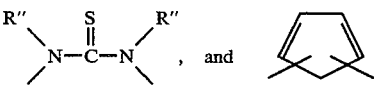

and

Y is selected from the group consisting of: —CN, —SCN, —SH, —S—CH₃, —S—C₂H₅, —S—C₃H₇, —NH₂, —NH—(CH₂)₂—NH₂, —NH—(CH₂)₂—NH—(CH₂)₂—NH₂, —N(CH₃)₂, —N(C₂H₅)₂, —N(C₃H₇)₂,

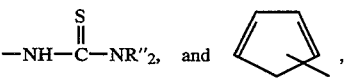

wherein R" is selected from the group consisting of: H, a linear or branched alkyl group having 1 to 5 carbon atoms and a —(CH₂)ₙ—NR'''₂ group, in which n signifies a number from 1 to 6, and R''' is H or a linear or branched alkyl group having 1 to 5 carbon atoms, wherein the free valences of the oxygen atoms bound to the Si atoms are saturated as in silica skeletons by silicon atoms of further groups of formula IV and/or via the metal atoms in one or several cross-linking binding links selected from the group consisting of formula (V) represented as follows:

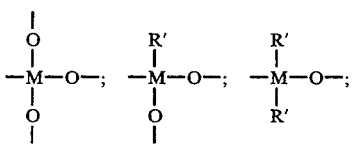  (V)

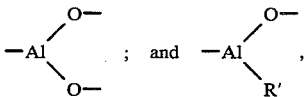

wherein M is selected from the group consisting of: an Si, Ti and Zr atom, and R' is selected from the group consisting of: a linear or branched alkyl group with 1 to 5 carbon atoms and a phenyl group, wherein a ratio of the silicon atoms from the groups of formula (IV) to the metal atoms in the cross-linking binding links (V) is in the range of 1:0 to 1:30 and the copolycondensate is present macroscopiccally as spherical particles having a diameter in the range of 0.01 to 3.0 mm, a specific surface in the range of 0.01 to 1000 m²/g, a specific pore volume in the range of 0.01 to 6.5 ml/g and a bulk density in the range of 50 to 1000 g/l.

2. The process according to claim 1, wherein the catalyst is used for reactions in a liquid phase or in a gas phase.

3. The process accordingly to claim 1, wherein the catalyst is used for reactions in a suspension, in a fixed bed or in a fluidized bed.

* * * * *